Figure 1:
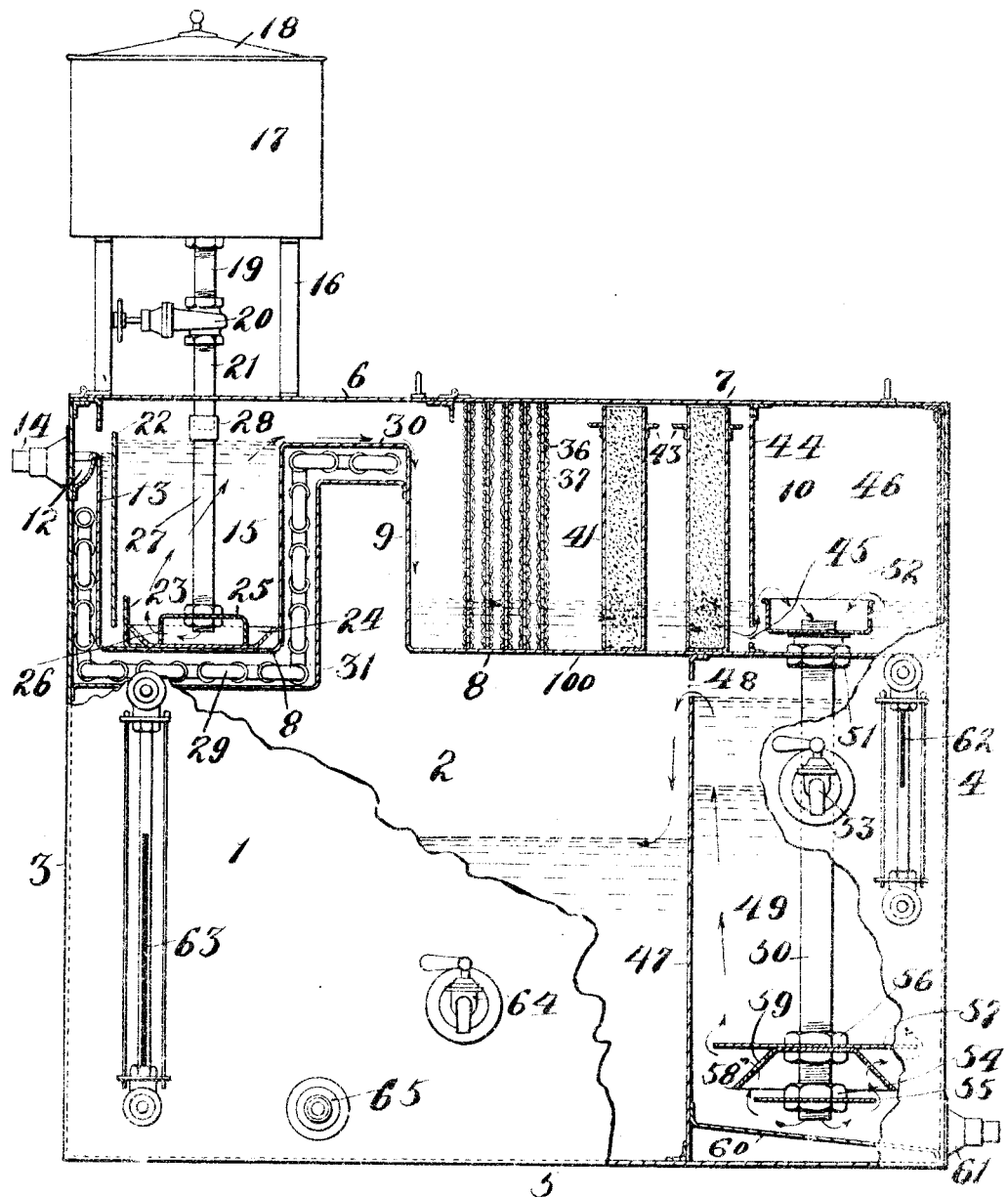

W. F. WARDEN.
FILTER.
APPLICATION FILED JAN. 5, 1914.

1,108,037.

Patented Aug. 18, 1914.
2 SHEETS—SHEET 1.

WITNESSES:
Jas L Butler
A. L. McClintock

Wm F. Warden,
INVENTOR.
BY
C. E. Humphrey
ATTORNEY.

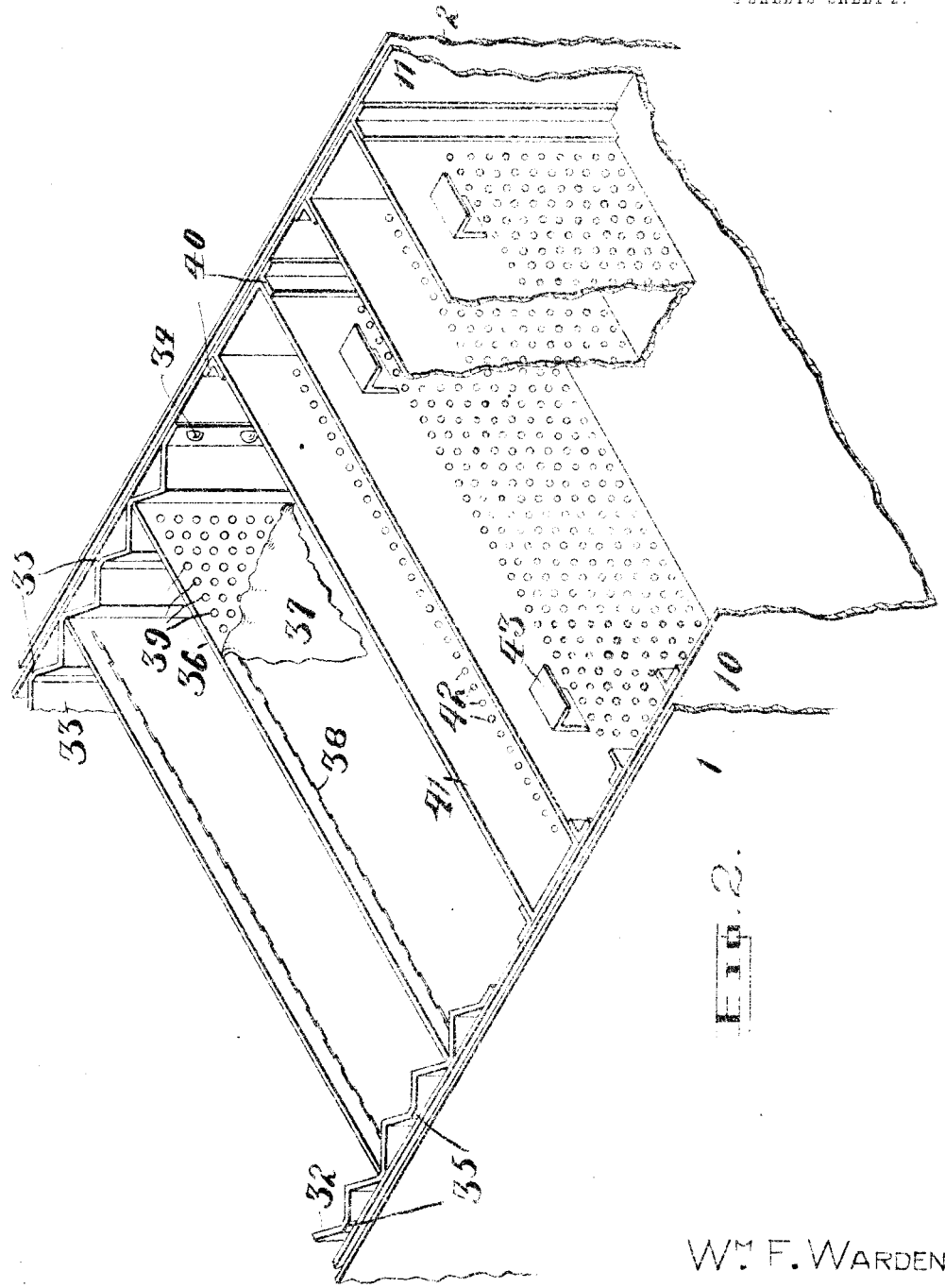

UNITED STATES PATENT OFFICE.

WILLIAM F. WARDEN, OF AKRON, OHIO.

FILTER.

1,108,037.     Specification of Letters Patent.     Patented Aug. 18, 1914.

Application filed January 5, 1914. Serial No. 810,364.

*To all whom it may concern:*

Be it known that I, WILLIAM F. WARDEN, a citizen of the United States, residing at Akron, in the county of Summit and State of Ohio, have invented new and useful Improvements in Filters, of which the following is a specification.

This invention relates to improvements in filters for purifying fluids, such for instance, as lubricating oils, but the device is capable of being used in connection with other fluids, and while the word "oils" in connection with this device is used generically throughout the specification and claims solely for brevity, it is not intended by the employment of the term to limit the use of the device.

The objects of the invention are to provide an improved filter in which substantially all portions or any selected portion thereof may be cleaned at will without interrupting the flow of the oil or necessitating the complete removal of the oil from the filter to accomplish the cleaning operation.

A further object is to provide a filter for the purpose described comprising a plurality of filtering media each one of which is individually removable either for cleaning or for any other purpose, without interrupting the flow of the oil and in which the filtering media are so arranged that their employment does not appreciably diminish the flow of the oil through the filter.

Another object is to interpose in the path of the flowing oil to be filtered, a heated baffle or dam over which the oil flows in a thin film during which it may be heated to thereby render the same lighter, and if possible, more fluent to increase the efficiency of the filter or render its purification easier.

A still further object is to provide efficient mechanism for accomplishing the beforementioned objects, said mechanism embodying improved means to permit the ready cleansing of the filter, a device particularly adaptable for use for the purposes to which it is to be put, and possessing the qualities of certainty of operation by reason of lack of necessity for interrupting the operation at any time between the filtering media and thereby permit an even, continuous flow of oil through the filter which is not appreciably diminished by the filtering operation.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in side elevation of filter embodying this invention with portions of the front side wall thereof broken away to better illustrate the interior construction thereof, the exposed portions being shown in section; and, Fig. 2, is a perspective view of a portion of the filtering media employed.

The filter body comprises a main tank or receptacle provided with side walls 1 and 2 and end walls 3 and 4, a lower or bottom wall 5 and with an open upper end. Extending upwardly from the lower wall 5 and stopping short of the upper portion of the tank is a partition or diaphragm 47 provided near its upper end with a transverse slot 48. Adapted to be positioned in the upper portion of the outer tank or receptacle is a smaller or inner tank denoted generally by the reference numeral 100, and comprising a lower wall 8 approximately parallel with the lower wall 5 of the main tank and provided intermediate its ends with an upturned portion 9 constituting a dam or baffle. The inner tank is provided with side walls 10 and 11 which lie parallel with the walls 1 and 2 of the main tank and in juxtaposition thereto. The left end wall 13 of the inner tank 100 is spaced from the corresponding wall 3 of the main tank and is provided with a laterally-extending flange to seat on the upper end of the wall 3 for supporting this end of the tank. The other end of the tank is provided with a wall which lies approximately parallel and seats on the wall 4 of the main tank. The right end of the inner tank 100 is adapted to seat on the partition 47 for supporting it. The inner tank 100 is provided with covers 6 and 7 by which access is had to the tank. The wall 3 of the main tank is provided below the upper end thereof with a cup-shaped receptacle 12 and is further provided with an opening communicating therewith and the outside of the wall 3 is provided with an overflow drain 14 for a purpose to be later described. The wall 13 of the inner tank 100 adjacent to the cup-shaped member 12 is provided with an opening and the material cut away in forming the opening is bent over the upper marginal wall of the cup-shaped member 12 to form a tight-joint therewith. The dam or baffle 9 of the inner tank is positioned at a point remote from the wall 13 to provide a sediment chamber 15 below the hinged cover 6 of the outer tank.

Mounted above, and if desired, on suitable supports, such for instance, as legs 16, on the cover 6, is a receiving tank 17 for dirty oil provided with a cover 18 and having a depending outlet 19 equipped with a controlling valve 20. Below the valve extends a pipe 21 into the chamber 15. Extending transversely between the walls 10 and 11 of the inner tank is a partition 22 spaced from the under face of the cover 6 and also spaced from the lower wall 8 of the inner tank. The diaphragm 22 is also removed a short distance from the end wall 13 of the inner tank to form an upwardly-extending passage-way for a purpose to be later described. Extending transversely between the side walls 10 and 11 and positioned near the lower wall 8 of the inner tank is an L-shaped baffle 23 the upper edge of which projects above the lower edge of the partition 22 and is spaced therefrom to provide a passage-way. Positioned within the chamber 15 is a saucer-shaped member 24 provided with upwardly-flaring side walls extending laterally sufficiently to loosely engage the baffle 23 and the wall of the chamber 15. Centrally of the upper face of the member 24 is an inverted cup-shaped spreader 25 provided usually on one side only with discharge openings 26. Secured to the upper wall of the cup-shaped element 25 is an upwardly-projecting pipe 27 provided at its upper end with a socket 28 to receive the lower depending end of the pipe 21. The chamber 15 is surrounded by a heating coil 29 which also extends laterally under the horizontal upper face 30 of the dam or baffle 9. Around the heating coils 29 and extending between the side walls 10 and 11 is an inclosing casing 31, secured to the wall 3 and contacting with the dam or baffle 9.

On the inner faces of the side walls 10 and 11 of the inner tank are two plates 32 and 33 with their ends secured in position by rivets 34 or otherwise, and with their intermediate portions provided with V-shaped corrugations with the indentations of one plate positioned opposite to the similar indentations of the opposing plate. Normally with the ends of these plates secured to the walls 10 and 11 the outer projecting points of the corrugations will lie away from the walls 10 and 11 as shown at 35. The distance between the indentations or outwardly-projecting portions of these plates is discretionary and is controlled largely by the uses to which the filter is to be put. The V-shaped portions of these plates constitute vertically-arranged seats for receiving and holding transversely-extending filtering media each of which customarily comprises a perforated plate 36 on which is placed one or more layers of a filtering cloth or fabric 37 preferably secured to place by the hold-fast devices, such as stitches 38 extending through the perforations 39 of the plate. By securing the plates 32 and 33 at their ends and with their intermediate portions normally out of contact with the walls 1 and 2 at the points 35 these plates constitute frictional means for holding the filtering media 36 in position and also by their pressure against the plates 32 and 33 form comparatively fluid-tight joints so as to prevent the passage of the oil around the ends of the plates 36. The number of the filtering media 36, the distance between them, and their position in the inner tank, will, of course, depend upon the requirements of the case and it may be stated that the invention is not limited by the number shown or illustrated in the drawings.

On opposite sides of the inner faces of the walls 10 and 11 are a plurality of angle-plates 40 arranged in pairs, the members of each pair spaced apart and with the members of each pair on the two plates 10 and 11 arranged opposite to each other. These angle-plates extending vertically provide upright seats or ways for boxes 41 having in the walls thereof perforations 42 and customarily filled with a filtering material. These boxes or tanks are provided with side handles 43 for use in moving them and as they extend from the bottom to the top all oil passing through the filter must pass through them.

At the right of the inner tank is a transversely-extending diaphragm 44 provided near its lower portion with a transverse slot 45 positioned a short distance above the lower wall 8 of the inner tank, thereby providing a chamber 46. Between the partition 47 and the side wall 4 of the outer tank is a chamber 49. The lower wall 8 of the chamber 46 of the inner tank is provided with an aperture through which extends downwardly a pipe 50 preferably held in place by a pair of clamping nuts 51 and this pipe projects upwardly into the chamber 46 and is threaded to receive a cup-shaped member 52 having a threaded orifice in its lower wall, the threads of which run on the threads of the upper end of the pipe 51. The chamber 49 is provided with a cock 53 positioned at the water level. The lower end of the pipe 50 is threaded and between a pair of clamping nuts 54 thereon is a baffle plate 55 and above the baffle plate 55 is a pair of clamping nuts 56 holding between them a baffle plate 57 and a frusto-conically-formed member 58 provided with apertures 59. Extending between the partition 47 and the outer wall 4 of the main tank is an inclined plate 60 forming a floor or lower wall of the chamber 49 and the wall 4 is provided adjacent to the lower side of the wall 60 with a drain pipe 61. The wall 1 is provided with ordinary sight-gages 62 and 63, a valve 64 and a nipple 65, the latter pipe connections for a purpose to be later described.

The operation of this device is as follows, and in describing the operation a partial enumeration and description of the special advantages obtained by this improved construction are given: The first step in the operation of the filter consists in filling the chamber 15 with clean water until high enough to overflow through the outlet 14, after which the cover 6 is closed and the receiving tank 17 placed in position with the lower end of the pipe 21 seated in the socket 28 and the valve 20 closed. The valve 53 is then opened and a sufficient quantity of clean water is placed in the chamber 49 to cause it to overflow through the valve 53, after which this valve is closed and the filter is ready for operation. Of course, before the filter is used a check valve is placed on the outlet 61 to prevent the escape of the water in the chamber 49. When it is desired to use the filter for what is known as a dry filter, and simply heat the oil previous to its being filtered without washing the same, no water is placed in the chamber 15. The dirty oil is placed in the receiving tank 17 and the valve 20 opened slightly to permit an even and steady flow of the oil downwardly through the pipes 21 and 27 into the spreading element 25. The heavier foreign matters, such as dirt and metallic chips will be deposited in the pan 24 and the oil will flow outwardly through the openings 26 and upwardly in the direction of the arrows over the dam or baffle 9. As the interior of the chamber is heated by the coil 29, the oil is gradually heated as it rises in the chamber 15 and flows in a thin stream over the upper face 30 of the baffle 9 and during its passage over this surface 30 it is exposed more directly to the heat and is warmed to a desired degree.

It will be noted that the partition or diaphragm 22 is higher than the upper edge of the cup-shaped overflow 12, and hence, the oil is prevented from overflowing outwardly through this opening. The usual washing of the oil takes place in its passage upwardly from the spreader 25 to the baffle 9, and hence, a large percentage of the dirt in the oil is washed out. It will be noted that by providing the valve 20 no matter how great a volume of oil is placed in the tank 17 the flow downwardly through the spreader 25 is even and continuous. By positioning the openings 26 on the one side of the spreader away from the baffle 9 the oil is caused to travel in minute globules upwardly a greater distance than if the spreader was provided with openings on all sides. In passing over the baffle 9 the oil flows in a thin film or stream into the bottom of the inner tank 100 and passes from thence to the right in the direction of the arrows through the filtering members 36 and 41 and through the slot 45 in the partition 40 and into the cup-shaped member 52 and downwardly through the pipe 50 around the baffle 55 through the openings 59 in the conical baffle 58 and around the outer edges of the upper baffle 57 and through the water in the chamber 49 and out through the slot 48 into the chamber for purified oil from whence it is drawn either through the cock 64 or by means of a pipe connection 65 when the filter is connected with what is known as an oiling system.

By making the cup-shaped element 52 vertically adjustable it constitutes a shut-off or valve when raised to a height greater than the level of the oil in the tank 100 and affords an effective dam against further movement of the oil, and at the same time, by adjusting the height of this cup 52 the flow of oil through the filter may be regulated to suit the requirements of the case.

Should it be desired at any time to clean the chamber 49 the upper clamping nut 52 and the cup-shaped member are removed and the inner tank 100 lifted out. However, should it only be necessary to wash the interior of this tank the cup-shaped member is raised sufficiently to stop the flow of oil through the pipe 50, the cock 53 is opened and the oil above the water in the chamber 49 is drawn through the outlet 53, after which the dirty water is permitted to escape through the drain 61 and access is had for washing purposes.

I claim:—

1. An oil filter embodying a receptacle, a vertical baffle or dam extending upwardly from the lower wall thereof and terminating below the top of said receptacle, a portion of said receptacle at one side of said baffle constituting an oil heating and a sedimentation tank for the reception of dirty oil, a plurality of spaced upwardly-extending independently-removable filtering media mounted in the other portion of said receptacle, means to heat said sedimentation tank and said baffle to thereby render the oil free flowing and capable of passing in a heated condition over the upper face of said baffle in a thin film from said sedimentation tank to said filtering tank.

2. An oil filter embodying a receptacle, a vertical baffle or dam extending upwardly from the lower wall thereof and terminating below the top of said receptacle, a portion of said receptacle at one side of said baffle constituting an oil heating and a sedimentation tank for the reception of dirty oil, a plurality of spaced seats in the other portion of said receptacle, a plurality of upwardly-extending, independently-removable filtering media mounted in said seats, means to heat said sedimentation tank and said baffle to thereby render the oil free flowing and capable of passing in a heated condition over the upper face of said baffle in a thin film from said sedimentation tank to said filtering tank.

3. An oil filter embodying a horizontal receptacle divided by a vertical baffle or dam extending upwardly from the lower wall of the receptacle and terminating below the top thereof, a portion of said receptacle at one side of said baffle containing water to constitute a bath and sedimentation tank for the reception of dirty oil, said portion provided with a water overflow below the top of the baffle, a plurality of spaced upwardly-extending, independently-removable filtering media mounted in the other portion of said receptacle, means to heat said sedimentation tank and said baffle to render the oil free flowing and capable of passing in a thin film and in a washed and heated condition over the upper face of said baffle from the sedimentation tank to said filtering tank.

In testimony whereof I have hereunto set my hand in presence of two subscribing witnesses.

WILLIAM F. WARDEN.

Witnesses:
C. E. HUMPHREY,
A. L. McCLINTOCK.